US009599198B2

(12) United States Patent
Cheng et al.

(10) Patent No.: US 9,599,198 B2
(45) Date of Patent: Mar. 21, 2017

(54) DEVICE FOR TRANSMITTING MECHANICAL TORQUE BETWEEN A DRIVING MEMBER AND A DRIVEN MEMBER, AND AIR-COMPRESSION SYSTEM FOR SUPPLYING POWER TO AN ENGINE USING SUCH A DEVICE

(75) Inventors: Thierry Cheng, Les Brevieres (FR); Patrick Sega, Maison Lafitte (FR); Damien Alfano, Cergy Pontoise (FR)

(73) Assignee: Valeo Systemes de Controle Moteur, Cergy Pontoise (FR)

( * ) Notice: Subject to any disclaimer, the term of this patent is extended or adjusted under 35 U.S.C. 154(b) by 980 days.

(21) Appl. No.: 13/810,010

(22) PCT Filed: Jul. 12, 2011

(86) PCT No.: PCT/FR2011/051665
§ 371 (c)(1),
(2), (4) Date: Mar. 15, 2013

(87) PCT Pub. No.: WO2012/007687
PCT Pub. Date: Jan. 19, 2012

(65) Prior Publication Data
US 2013/0172138 A1 Jul. 4, 2013

(30) Foreign Application Priority Data

Jul. 12, 2010 (FR) ...................................... 10 55682

(51) Int. Cl.
*F02B 33/44* (2006.01)
*F16H 7/02* (2006.01)
(Continued)

(52) U.S. Cl.
CPC .............. *F16H 7/02* (2013.01); *B60K 25/02* (2013.01); *F02B 37/04* (2013.01); *F02B 37/127* (2013.01);
(Continued)

(58) Field of Classification Search
CPC . F16H 7/02; B60K 25/02; F02B 37/04; F02B 39/04; F02B 39/12
(Continued)

(56) References Cited

U.S. PATENT DOCUMENTS 5,729,978 A * 3/1998 Hiereth ................ F02B 37/105
60/607
5,890,468 A 4/1999 Ozawa
(Continued)

FOREIGN PATENT DOCUMENTS

GB           2400410 A * 10/2004 ............. F02B 39/04
KR   DE 102010060943 A1 *  4/2012 ............. F02B 37/04
WO          02/064997 A1    8/2002

OTHER PUBLICATIONS

International Search Report issued in PCT/FR2011/051665 mailed Sep. 29, 2011 (4 pages).
(Continued)

*Primary Examiner* — Nicholas J Weiss
*Assistant Examiner* — Ngoc T Nguyen
(74) *Attorney, Agent, or Firm* — Osha Liang LLP

(57) ABSTRACT

The invention relates to a device for transmitting mechanical torque between a driving member and a driven member, in particular between a heat engine and an air compressor (2) for supplying power to the engine. Said transmission device includes at least one pulley (10, 11, 12, 13), for transmitting the torque between the driving member and the driven member, and a release means (17) controlling at least one of said pulleys (10, 11, 12, 13) so as to enable the transmission of the torque between the driving member and the driven member when the latter are in an engaged state, or so as to restrict the transmission when the latter are in a disengaged state. The invention also relates to an air-compression system for supplying power to a heat engine, in particular for a motor vehicle, said system including a compressor (2) and
(Continued)

Figure 1:
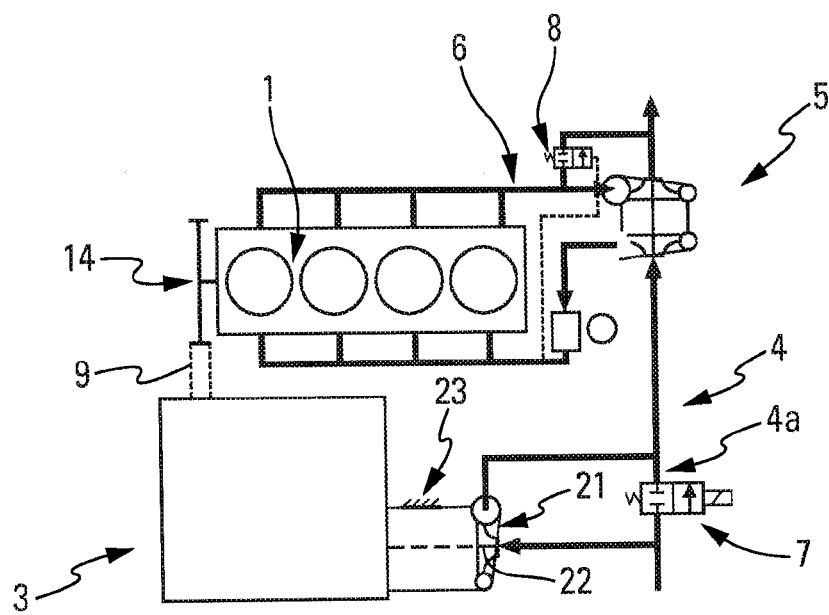

a torque-transmitting device (3) enabling torque to be taken up on a belt (9) of the engine and said torque to be transmitted to the compressor, said transmission device (3) being capable of transmitting said torque at a first transmission ratio up to a certain engine speed threshold and of no longer transmitting said torque when said threshold is exceeded, or of transmitting said torque at a lower transmission ratio when the engine speed is above said threshold.

11 Claims, 4 Drawing Sheets

(51) Int. Cl.
    *B60K 25/02*     (2006.01)
    *F02B 37/04*     (2006.01)
    *F02B 37/12*     (2006.01)
    *F02B 39/04*     (2006.01)
    *F02B 39/12*     (2006.01)
    *F02B 67/06*     (2006.01)
    *F02B 37/18*     (2006.01)

(52) U.S. Cl.
    CPC .............. *F02B 39/04* (2013.01); *F02B 39/12* (2013.01); *F02B 67/06* (2013.01); *B60K 2025/022* (2013.01); *F02B 37/18* (2013.01); *Y02T 10/144* (2013.01)

(58) Field of Classification Search
    USPC .......................................................... 60/607
    See application file for complete search history.

(56) References Cited

U.S. PATENT DOCUMENTS

| | | | | |
|---|---|---|---|---|
| 5,937,831 | A | * | 8/1999 | Volkmann ............ F02D 41/0007 123/559.3 |
| 7,252,610 | B2 | * | 8/2007 | Miyata .................... F02B 67/06 123/90.31 |
| 7,765,805 | B2 | * | 8/2010 | Lofgren ................ F02B 37/105 123/559.1 |
| 2003/0116117 | A1 | * | 6/2003 | Tonnqvist ................ F01L 1/022 123/198 R |
| 2003/0116118 | A1 | * | 6/2003 | Tonnqvist ................ F02B 67/04 123/198 R |
| 2006/0254565 | A1 | * | 11/2006 | Bottcher ................ F02B 37/005 123/559.1 |
| 2007/0193563 | A1 | | 8/2007 | Beattie |
| 2010/0186725 | A1 | * | 7/2010 | Barker .................... F02B 39/12 123/559.3 |
| 2010/0282221 | A1 | * | 11/2010 | Le Lievre ................ F02B 39/12 123/559.1 |

OTHER PUBLICATIONS

Written Opinion issued in PCT/FR2011/051665 mailed Sep. 29, 2011 (13 pages).

R. Krebs et al.; "Neuer Ottomotor mit Direkteinspritzung and Doppelaufladung von Volkswagen. Tiel 2: Thermodynamik"; MTZ Motortechnische Zeitschrift, Vieweg Verlag, Wiesbaden, DE, vol. 66, No. 12; Dec. 1, 2005; pp. 978-986 (9 pages).

* cited by examiner

DEVICE FOR TRANSMITTING MECHANICAL TORQUE BETWEEN A DRIVING MEMBER AND A DRIVEN MEMBER, AND AIR-COMPRESSION SYSTEM FOR SUPPLYING POWER TO AN ENGINE USING SUCH A DEVICE

The present invention relates to a torque transmission device for transmitting a mechanical torque between a driving member and a driven member, notably between an engine and an air compressor supplying the engine. It also relates to an air-compression system supplying an engine, notably a petrol engine. It will be applicable, in particular, in the field of motor vehicles.

These days, efforts are being made to offer petrol drive systems that exhibit, for engines of reduced cylinder size, performance levels close to engines of larger cylinder size. It then becomes possible to equip cars with smaller engines, which will allow for a reduction of the fuel consumption and in greenhouse gas emissions, while maintaining their driving appeal.

For this, the engines are equipped with turbochargers, that is to say, a turbine, driven by the exhaust gases from the engine, linked in rotation to a compressor, compressing the air supplying the engine.

While such solutions make it possible to obtain satisfactory performance levels for vehicles that have reached a certain speed, they still pose problems for the take-off of the vehicle, that is to say, the transition from a situation in which the vehicle is stopped, with the engine idling, to a situation in which the vehicle is running at a sufficient speed.

One explanation that can be given for this phenomenon is that the turbochargers are truly effective only from a certain engine speed, a speed that is all the higher as the cylinder size becomes smaller, because of the associated exhaust-gas flow rates.

There is thus a need, for vehicles of reduced cylinder size, for a solution that makes it possible to complement the action of the turbocharger at low engine speeds.

On this subject, electrically driven compressors are known. They, however, require a power source and complex and costly control devices.

Top-up compressors are also known, driven by the belt of the engine in order to increase its performance levels. They, however, operate over the entire engine operating-speed range, in particular at high speeds, which requires them to have specific characteristics.

The aim of the invention is to mitigate these difficulties and propose for this purpose an air-compression system supplying a heat engine, notably of a motor vehicle. The air-compression system includes a compressor, notably centrifugal, and a torque transmission device, making it possible to take a torque from a belt driven by a crankshaft of the engine and to transmit the torque to the compressor.

The belt consists, for example, of an accessory belt of the engine. This should be understood to mean a belt driven by the crankshaft of the engine and used to drive various accessories, for example, engine-cooling circuit pumps, air-conditioning compressors, or others.

According to the invention, the torque transmission device is capable of transmitting the torque with a first transmission ratio up to a certain engine speed threshold, and then stop transmitting the torque, or transmitting the torque with a lower transmission ratio, above the threshold. The latter lies, for example, between 2000 and 3000 rpm. It is, notably, approximately 2500 rpm.

There is thus a solution that will no longer demand the compressor at high speed. It can therefore be engineered to be reliable without having to implement the complex solutions encountered in the devices that have to rotate at very high speed. This makes it a simple and robust solution that makes it possible to support a turbocharger, specifically within the range in which it has little or no effectiveness.

It has, moreover, been observed on that point that there was a general need for reliable and inexpensive torque transmission devices for transmitting a mechanical torque between a driving member and a driven member when the driven member must not or does not need to be driven at high speed.

Also, the invention equally relates to a device for transmitting a mechanical torque between a driving member and a driven member, notably between an engine and an air compressor supplying the engine, the torque transmission device includes at least one pulley for transmitting the torque between the driving member and the driven member and disengaging means acting on one of the at least one pulley to allow for a transmission of the torque between the driving member and the driven member, when they are in an engaged state, or not, when they are in a disengaged state.

According to different embodiments:
- the disengaging means includes a first rotor, capable of being driven in rotation by the driving member, and first coupling/uncoupling means for rotationally coupling/uncoupling an engaging pulley with the first rotor,
- the first coupling/uncoupling means includes a winding generating an electromagnetic field; the first rotor, the engaging pulley and the winding is configured to allow the engaging pulley to be driven by the first rotor when the winding is powered by electrical current,
- at least one of the engaging pulley and/or the first input pulley are speed change pulleys that have a speed-reducing and/or gearing-down ratio that makes it possible to drive the driven member at a speed different from that of the driving member,
- the engaging pulley is the, or one of the, speed change pulleys,
- the engaging pulley is capable of driving the driven member,
- the device includes an engaging belt linked to the engaging pulley, the engaging belt is linked to the driven member,
- a first input pulley and the engaging pulley are mounted free to rotate about the same shaft, the engaging pulley being linked in rotation to the first input pulley,
- the first input pulley is also the, or one of the, speed change pulleys,
- the first rotor or the first input pulley, is designed to be capable of being driven by the driving member,
- the first input pulley is a pulley capable of operating in freewheeling mode.

According to an implementation making it possible to drive the driven member at two different speeds for one and the same speed of rotation of the driving member:
- the device includes a second input pulley, capable of operating in freewheeling mode, the device being configured so that the second input pulley can transmit the engine torque to the driven member when the disengaging means are in a disengaged state,
- the second input pulley has a speed-reducing and/or gearing-down ratio different from that of the device when the torque is transmitted by the disengaging means, the second input pulley is capable of being driven by the driving member, the second input pulley is capable of being linked in rotation to the driven member, the device includes a driving pulley, linked in rotation to the second input pulley and driven in rotation by the engaging pulley, and supplementary disengaging means, provided between the driving pulley and the driven member to allow the driven member to be driven by the driving pulley or to not allow the driven member to be driven by the driving pulley, the supplementary disengaging means includes a second rotor, capable of being linked in rotation to the driven member, and a second coupling/uncoupling means for rotationally coupling/uncoupling the driving pulley with the second rotor.

In the application to the air-compression system described above, the driving member is the belt of the engine and the driven member is an input wheel of a gearing-down device of the compressor. According to different embodiments:

the gearing-down device has a gearing-down ratio between 10 and 15 and/or the speed change pulleys of the torque transmission device ensures a gearing-down ratio of approximately six between the belt and the input wheel of the gearing-down device of the compressor, the disengaging means are configured to allow a transmission of the torque between the engine and the compressor up to a threshold engine speed, the threshold engine speed is between 2000 and 3000 rpm, notably 2500 rpm.

Figure 2:
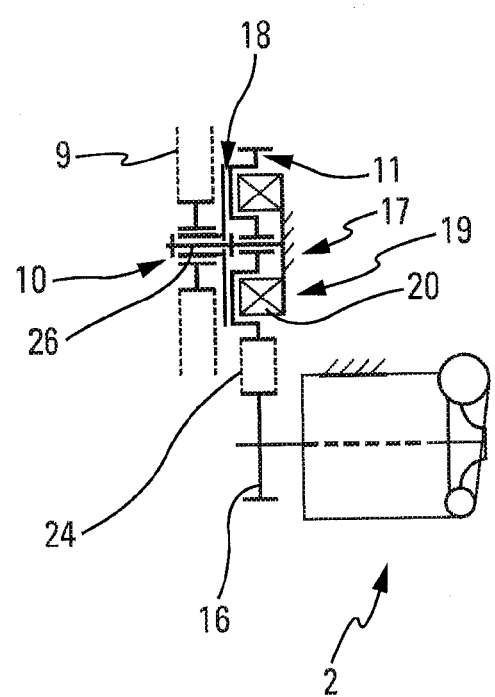
Figure 3A:
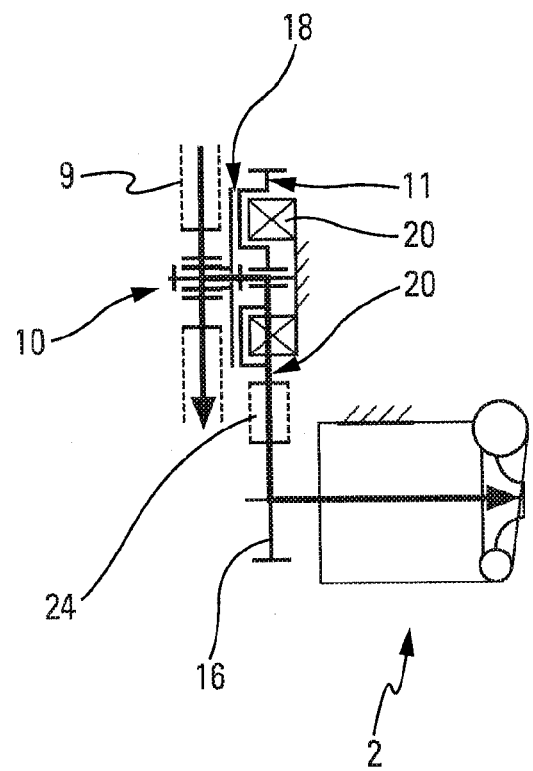
Figure 3B:
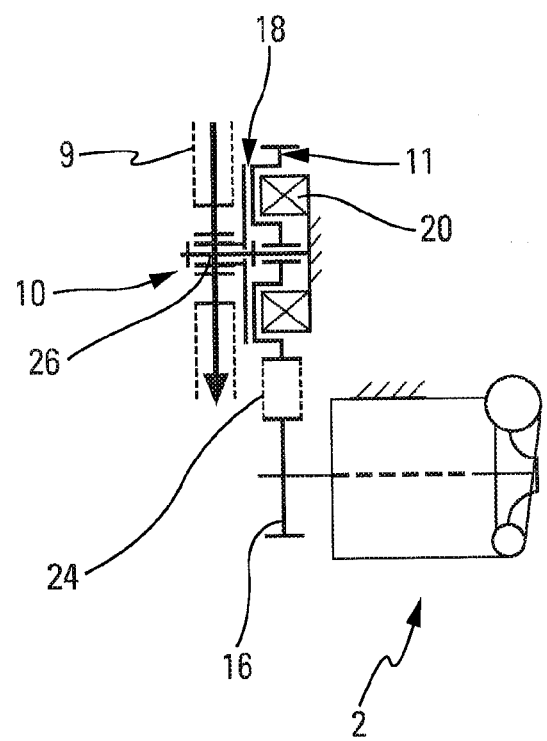
Figure 4:
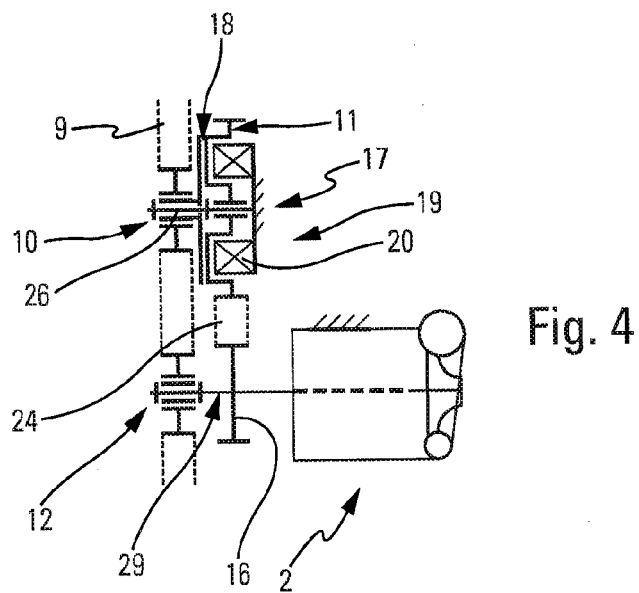
Figure 5A:
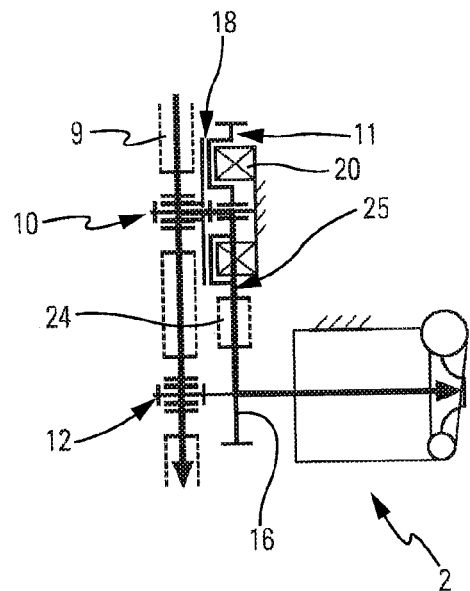
Figure 5B:
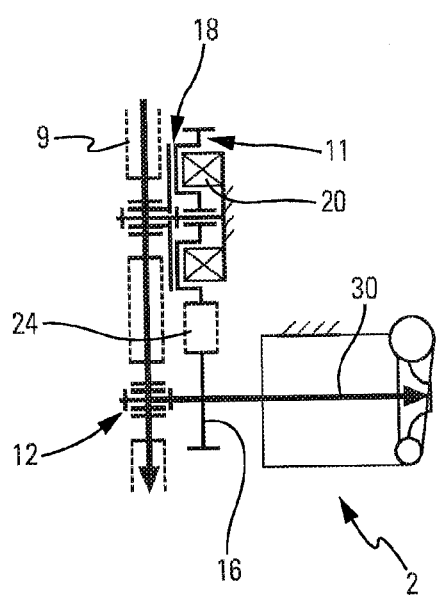
Figure 6:
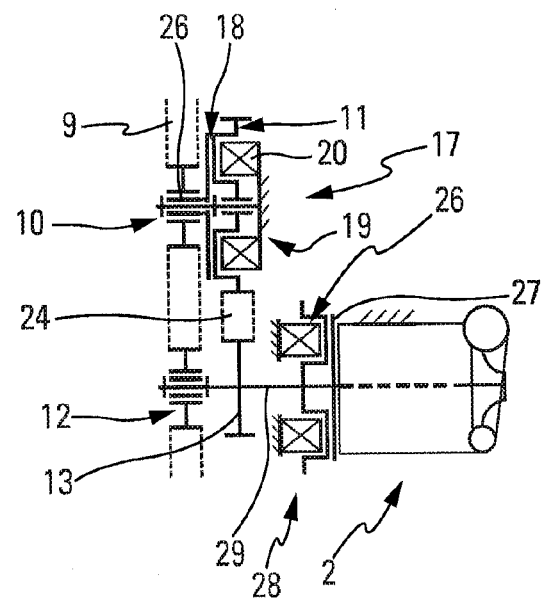

The invention will be better understood in light of the following description which is given solely as an indication and whose aim is not to limit it, accompanied by the appended drawings, in which:

FIG. 1 schematically illustrates an exemplary embodiment of a compression system according to the invention, FIG. 2 schematically illustrates a first exemplary embodiment of a torque transmission device of the compression system of FIG. 1, FIGS. 3*a* and 3*b* schematically illustrate the use of the device of FIG. 2 according to an engaged state and a disengaged state of its disengaging means, FIG. 4 schematically illustrates a variant embodiment of the device of FIG. 2, FIGS. 5*a* and 5*b* schematically illustrate the use of the device of FIG. 4 according to an engaged state and a disengaged state of its disengaging means, FIG. 6 schematically illustrates another variant embodiment of the device of FIG. 2, FIGS. 7*a*, 7*b* and 7*c* schematically illustrate the use of the device of FIG. 6 according to different states of its various disengaging means.

As illustrated in FIG. 1, the invention relates first of all to an air-compression system that supplies a heat engine 1, notably of a motor vehicle. The air-compression system includes a compressor 2 and a torque transmission device 3.

The compressor 2 is situated, for example, along an air supply line 4 of the engine 1 or air intake line. The air supply line 4 also includes, for example, a turbocharger 5, driven on the basis of the kinetic energy of the exhaust gases from the engine circulating in an exhaust line 6.

The compressor 2 is situated, notably, upstream of the turbocharger 5 in the direction of flow of intake air. It will be able to be mounted in parallel with a main portion 4*a* of the air intake line. A valve 7 is then possibly provided to direct the intake air, either through the compressor 2 or through the main portion 4*a*.

On the exhaust side, a valve 8 will also be able to be provided to allow the exhaust gas not to pass through the turbine of the turbocharger 5.

According to the invention, the torque transmission device 3 makes it possible to take a torque from a belt 9 of the engine 1 and to transmit the torque to the compressor 2. The torque transmission device 3 is capable of transmitting the torque with a first transmission ratio up to a certain engine speed threshold and then stop transmitting the torque, or transmitting the torque with a lower transmission ratio, above the threshold.

It is thus possible to use a compressor which will not have to suffer rotational stresses at very high speed, for example by avoiding speeds greater than 150 000 rpm.

The engine speed threshold lies, for example, between 2000 and 3000 rpm. It is, notably, approximately 2500 rpm. The compressor can then support the turbocharger over the ranges precisely where the latter is weak.

The compressor 2 includes, for example, a centrifugal compressor having a bladed wheel 21, linked to a driveshaft 22, known to the person skilled in the art. The wheel is, for example, driven by a gearing-down device 23 internal to the compressor, notably of the type of that is described in the document WO 02/064997. The gearing-down device is used, for example, in a configuration where it has a gearing-down ratio of approximately 10 to 15.

The torque transmission device 3 according to the invention will, for its part, be able to have a gearing-down ratio of approximately six between the driving member, here the belt 9 of the engine 1, and the driven member, here an input wheel 16 of the gearing-down device of the compressor 2. In other words, the input wheel 16 will rotate approximately six times faster than the crankshaft of the engine.

As illustrated in the following figures, the invention also relates to a device for transmitting a mechanical torque between a driving member and a driven member. The latter will be of use both in the applications described above and, more widely, in any mechanical system employing a driving member rotationally driving a driven member, in particular a driven member for which there is a desire not to have it driven at excessive speeds during the revving-up of the driving member.

The torque transmission device includes at least one pulley 10, 11, 12, 13 for transmitting the torque between the driving member, here the belt 9, and the driven member, here the input wheel 16 of the gearing-down device 23 of the compressor 2, and disengaging means 17 acting on at least one of the at least one pulley 10, 11, 12, 13 to allow for a transmission of the torque between the driving member and the driven member when they are in an engaged state, or not allow for the transmission of the torque between the driving member and the driven member when they are in a disengaged state.

The disengaging means includes, for example, a first rotor 18, capable of being driven in rotation by the driving member, and first coupling/uncoupling means 19 for rotationally coupling/uncoupling an engaging pulley 11 with the first rotor 18.

The first coupling/uncoupling means 19 includes a winding 20, generating an electromagnetic field, the first rotor 18, the engaging pulley 11 and the winding 20 are configured to allow the engaging pulley 11 to be driven by the first rotor 18 when the winding is powered by electrical current. The first rotor 18 consists, notably, of a disk made of ferromagnetic material, whereas the winding 20 is oriented on an axis at right angles to the disk passing through its center, the axis also being the axis of rotation of the engaging pulley 11. The powering of the winding 20 by electrical current causes the disk to be stuck against the engaging pulley 11 and allows it to be driven in rotation.

In one or more embodiments, speed change pulleys are able to have a speed-reducing and/or gearing-down ratio making it possible to drive the driven member at a speed different from that of the driving member. It is, for example, a gearing-down ratio that makes it possible to drive the driven member faster than the driving member.

The engaging pulley 11 is, for example, the, or one of the, speed change pulleys.

The engaging pulley 11 is capable of driving the driven member. It has, notably, a gearing-down ratio of two. In other words, in the application illustrated, the engaging pulley 11 drives the input wheel 16 of the gearing-down device 23 two times faster than its own speed.

For this, the device includes, for example, an engaging belt 24, linked to the engaging pulley 11, the engaging belt 24 being capable of being linked to the driven member.

In one or more embodiments, a first input pulley 10 and the engaging pulley 11 are, for example, mounted free to rotate about one and the same fixed shaft 26, the engaging pulley 11 is linked in rotation to the first input pulley 10.

The first input pulley 10 will also be able to be the, or one of the, speed change pulleys.

The first rotor 18 or the first input pulley 10 is designed to be capable of being driven by the driving member. Also, the first input pulley 10 has a gearing-down ratio, for example, of three. In other words, in the application illustrated, the first input pulley 10 rotates three times faster than the crankshaft of the engine.

The speed change pulleys, i.e., either one of the engaging pulley 11 or the first input pulley 10, or both, ensures a gearing-down ratio of approximately six between the crankshaft of the engine and the input shaft 16 of the gearing-down device 23 for the compressor 2. There is thus achieved, with the gearing-down device 23, a speed-reduction ratio of approximately 80 between the crankshaft and the driveshaft 22.

The first input pulley 10 will be able to be a pulley capable of operating in freewheeling mode. This presents the advantage, notably, of avoiding the returns of torque from the driven member to the driving member. Such returns of torque can occur, with air compressors supplying an engine if the acceleration set-point of the vehicle is stopped.

Figure 7A:
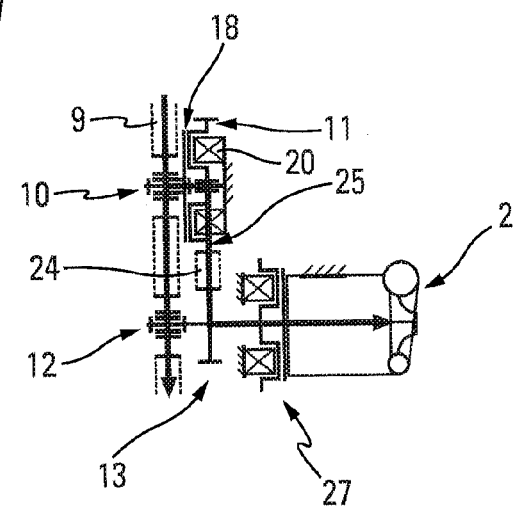

As illustrated in FIGS. 3a, 5a and 7a, when the engaging pulley 11 is engaged on the first rotor 18, in other words when the winding 20 is powered, the mechanical torque is transmitted from the driving member, here the belt 9, to the first input pulley 10, from the latter to the first rotor 18, from the latter to the engaging pulley 11, from the latter to the engaging belt 24 and from the latter to the driven member, here the input wheel 16 of the gearing-down device 23 for the compressor 2, as is illustrated by the arrow marked 25.

Figure 7B:
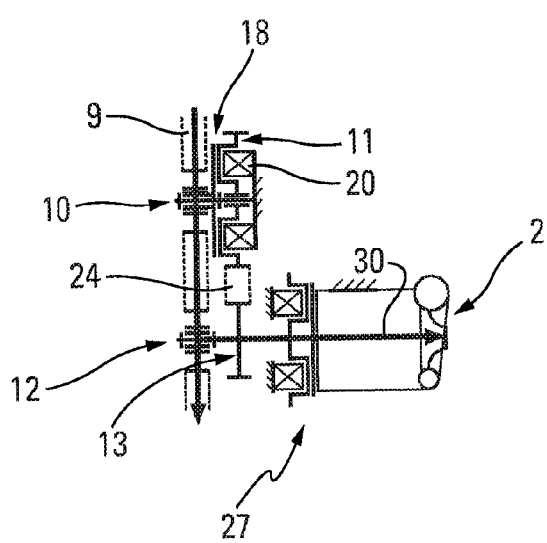
Figure 7C:
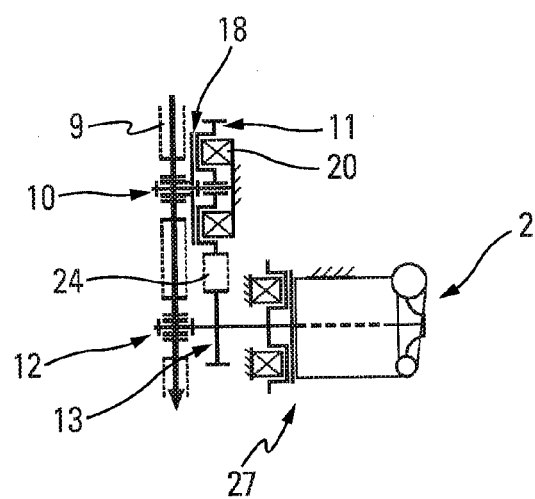

Conversely, as illustrated in FIGS. 3b, 5b and 7b, when the engaging pulley 11 is disengaged, in other words when the winding 20 is not powered, the mechanical torque is not transmitted from the driving member to the driven member, or is transmitted by a different path.

On this subject, according to the embodiment of FIGS. 2 and 3, the mechanical torque is not transmitted from the driving member to the driven member, the transmission of the torque remaining at the first input pulley 10.

That said, as illustrated in the following figures, the invention makes it possible, in other embodiments, to drive the driven member at at least two different speeds for one and the same speed of rotation of the driving member.

For this, the torque transmission device according to the invention includes, for example, a second input pulley 12 capable of operating in freewheeling mode, the torque transmission device being configured so that the second input pulley 12 can transmit the engine torque to the driven member when the disengaging means 17 are in a disengaged state. In other words, the torque is transmitted without passing through the disengaging means 17.

The second input pulley 12 has a speed-reduction and/or gearing-down ratio different from that of the device when the torque is transmitted by the disengaging means 17.

The second input pulley 12 is capable of being driven by the driving member. It has, for example, the same gearing-down ratio as the first input pulley 10, namely, for example, a gearing-down ratio of three. In other words, in the application illustrated, it rotates three times faster than the engine crankshaft.

As illustrated in FIGS. 4 and 5, the second input pulley 12 is linked in rotation, for example, to the driven member, notably by being capable of being mounted on one and the same shaft 29.

According to this embodiment, as illustrated in FIG. 5a and as indicated above, when the engaging pulley 11 is engaged on the first rotor 18, in other words when the winding 20 is powered, the mechanical torque is transmitted from the driving member, here the belt 9, to the driven member, here the input wheel 16 of the gearing-down device 23 for the compressor 2, via the first input pulley 10, the first rotor 18, the engaging pulley 11, and the engaging belt 24, and this occurs with a first gearing-down ratio, originating from the gearing-down ratio ensured by the first input pulley 10 and the engaging pulley 11, here a ratio of six. The second input pulley 12 is consequently driven faster by the driven member than by the driving member and operates in freewheeling mode.

On the other hand, as illustrated in FIGS. 5b and 7b, when the engaging pulley 11 is disengaged, the torque is transmitted from the driving member to the driven member by the second input pulley 12, and this is done with a speed-reduction ratio originating only from that of the second input pulley 12, here a speed-reduction ratio of three, as illustrated by the arrow marked 30. The engaging pulley 11 does in fact rotate, but only under the action of the driven member.

In other words, when the disengaging means are activated, the driven member is driven two times slower than when the first rotor 18 is meshed with the engaging pulley 11. Again, in other words, in the application illustrated, the gearing-down ratio between the crankshaft and the driveshaft 22 of the compressor is approximately 40 when the disengaging means 17 are activated and 80 when they are not.

It will then be able to envisage using the compressor 2 also for higher engine speeds, which will make it possible to dispense with a turbocharger.

As illustrated in FIGS. 6 and 7, according to another embodiment, it will also be possible to provide a driving pulley 13, linked in rotation to the second input pulley 12 and driven in rotation by the engaging pulley 11, for example by the engaging belt 24, and supplementary disengaging means 26, provided between the driving pulley 13 and the driven member, here an input shaft of the gearing-down device for the compressor, so as to allow the driven member to be driven by the second engaging pulley 12 or to not be driven by the 10 second engaging pulley 12.

It is thus possible to combine the operating modes of the preceding two embodiments. In practice, according to a first configuration, corresponding to FIGS. 7*a* and 7*b*, the supplementary disengaging means 26 allow the torque to pass between the driving pulley 13 and the driven member, and, depending on the state of the disengaging means 17, the torque transmission device transmits torque from the driving member to the driven member according to a first or a second speed-reduction ratio. According to another configuration, corresponding to that of FIG. 7*c*, the supplementary disengaging means 26 are activated, preventing the passage of the torque between the driving pulley 13 and the driven member, and the driven member is not driven by the driving member.

The supplementary disengaging means 26 includes, for example, a second rotor 27, capable of being linked in rotation to the driven member, and second coupling/uncoupling means 28 for rotationally coupling/uncoupling the driving pulley 13 with the second rotor 27.

The second coupling/uncoupling means 28 includes the same structure and functions as the first coupling/uncoupling means 19.

The second input pulley 12, the driving pulley 13 and the second rotor 27 are provided, for example, on one and the same shaft 29.

According to the application illustrated, the disengaging means 17 is configured to be activated according to the threshold engine speed mentioned above. For this, they will be able to include, for example, a control device opening or closing a switch provided between the winding 20 and its power source should the threshold be crossed.

For the mounting of the torque transmission device, tensioning rollers will be able to be provided.

In a particular example of the system described in FIG. 1, the first input 10 and the second input 12 pulley are pulleys of an alternator, notably of a motor vehicle; also the engaging pulley 11 is an air-conditioning compressor pulley.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A device for transmitting a mechanical torque between a driving member and a driven member, the device comprising:
    at least one of an engaging pulley and a first input pulley that transmits the torque between the driving member and the driven member;
    disengaging means that act on at least one of the engaging pulley and the first input pulley to allow for a transmission of the torque between the driving member and the driven member, when they are in an engaged state, or not, when they are in a disengaged state; and
    a second input pulley, capable of operating in freewheeling mode,
    wherein the device is configured so that the second input pulley transmits the torque from the driving member to the driven member when the disengaging means are in a disengaged state.

2. The device as claimed in claim 1, wherein the disengaging means comprise a first rotor, capable of being driven in rotation by the driving member, and first coupling/uncoupling means for rotationally coupling/uncoupling the engaging pulley with said first rotor.

3. The device as claimed in claim 2, wherein the first coupling/uncoupling means comprise a winding that generates an electromagnetic field, and wherein the first rotor, the engaging pulley, and the winding is configured to allow the first rotor to drive the engaging pulley when the winding is powered by electrical current.

4. The device as claimed in claim 2, further comprising an engaging belt, linked to the engaging pulley, wherein the engaging belt is linked to the driven member.

5. The device as claimed in claim 2, wherein the first input pulley, and the engaging pulley are mounted free to rotate about a same shaft, and wherein the engaging pulley is linked in rotation to the first input pulley.

6. The device as claimed in claim 5, in which the first input pulley is a pulley capable of operating in freewheeling mode.

7. The device as claimed in claim 2, further comprising:
    a driving pulley, linked in rotation to the second input pulley and driven in rotation by the engaging pulley, and supplementary disengaging means, provided between the driving pulley and the driven member so that the driven member is driven by the driving pulley, and
    wherein the supplementary disengaging means comprise a second rotor, capable of being linked in rotation to the driven member, and second coupling/uncoupling means for rotationally coupling/uncoupling the driving pulley with the second rotor.

8. The device as claimed in claim 1, wherein the second input pulley has a speed-reducing and/or gearing-down ratio different from that of the device when the torque is transmitted by the disengaging means.

9. The device as claimed in claim 1, wherein at least one of the engaging pulley and/or the first input pulley are speed change pulleys that have a speed-reducing and/or gearing-down ratio that drives the driven member at a speed different from that of the driving member.

10. An air-compression system that supplies a heat engine of a motor vehicle, comprising:
    a compressor; and
    a torque transmission device as claimed in claim 1 for taking a torque from a belt driven by a crankshaft of the engine and transmitting said torque to the compressor, the torque transmission device transmits the torque with a first transmission ratio up to a certain engine speed threshold and stops, or transmits the torque with a lower transmission ratio above said threshold.

11. The device as claimed in claim 1, wherein the driving member is a heat engine and the driven member is an air compressor.

* * * * *